US012793065B2

(12) United States Patent
Balasubramanian et al.

(10) Patent No.: US 12,793,065 B2
(45) Date of Patent: Nov. 10, 2026

(54) DYNAMIC FINANCIAL PROTOCOL

(71) Applicant: Wells Fargo Bank, N.A., San Francisco, CA (US)

(72) Inventors: Ramya Balasubramanian, Hyderabad (IN); Rameshchandra Bhaskar Ketharaju, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/889,551

(22) Filed: Sep. 19, 2024

(65) Prior Publication Data

US 2026/0080408 A1 Mar. 19, 2026

(51) Int. Cl.
*G06Q 20/40* (2012.01)

(52) U.S. Cl.
CPC ..... *G06Q 20/4014* (2013.01); *G06Q 20/4015* (2020.05); *G06Q 20/4016* (2013.01)

(58) Field of Classification Search
CPC ............. G06Q 20/4014–4015; G06Q 20/4016
See application file for complete search history.

(56) References Cited

U.S. PATENT DOCUMENTS

2004/0230483 A1 11/2004 Kepecs
2008/0215346 A1 9/2008 O'Cinneide et al.
2009/0083174 A1 3/2009 Lynner
2009/0157519 A1 6/2009 Bishop et al.
2009/0204545 A1 8/2009 Barsukov
2010/0030688 A1* 2/2010 Patterson ............. G06Q 20/385 705/44
2010/0106611 A1* 4/2010 Paulsen ................... G07F 17/32 705/40
2014/0136408 A1* 5/2014 Andrews ................ G06Q 40/02 705/42
2014/0279834 A1* 9/2014 Tsirogiannis ......... G06F 16/235 707/602
2014/0372301 A1* 12/2014 Anamanamuri ..... G06Q 20/425 705/44

(Continued)

OTHER PUBLICATIONS

"From ISO 8583 to 20022: Modernizing the card payment messaging standard", Cognizant, 2023. (Year: 2023).*

*Primary Examiner* — Eric T Wong
(74) *Attorney, Agent, or Firm* — Merchant & Gould P.C.

(57) ABSTRACT

A computer system for generating a dynamic financial protocol can include: non-transitory computer-readable storage media encoding instructions which, when executed by the one or more processors, causes the computer system to: receive a request for a financial transaction from a user; validate information associated with the user, including Know Your Customer (KYC) details about the user; generate a financial identifier for the financial transaction, wherein the financial identifier is a global unique identifier for the financial transaction; generate a message in accordance with the dynamic financial protocol, wherein the message includes: the fixed part includes the user's KYC details, an account of the user, and the financial identifier; the configuration part includes account details of a recipient; and the dynamic part is a multidimensional array that includes additional transaction details; and process the financial transaction initiated by the user based on validation of the recipient using the financial identifier.

18 Claims, 4 Drawing Sheets

(56) References Cited

U.S. PATENT DOCUMENTS

| | | | | |
|---|---|---|---|---|
| 2015/0278815 | A1* | 10/2015 | Randazza | G06Q 20/202 705/72 |
| 2016/0180304 | A1* | 6/2016 | Carriles | G06Q 20/401 705/44 |
| 2018/0248699 | A1 | 8/2018 | Andrade | |
| 2018/0276667 | A1* | 9/2018 | Rajurkar | G06Q 20/102 |
| 2018/0315043 | A1 | 11/2018 | Royyuru et al. | |
| 2019/0180257 | A1 | 6/2019 | Lee et al. | |
| 2019/0311361 | A1* | 10/2019 | Kumar | G06Q 20/4015 |
| 2019/0384896 | A1* | 12/2019 | Jones | G06F 21/31 |
| 2020/0302427 | A1 | 9/2020 | Zarakas et al. | |
| 2021/0166286 | A1* | 6/2021 | Loomis | G06Q 30/0609 |
| 2022/0253815 | A1 | 8/2022 | Winslow et al. | |
| 2022/0270095 | A1* | 8/2022 | Modi | G06Q 20/405 |
| 2023/0070039 | A1* | 3/2023 | Ahuja | G06Q 20/38215 |
| 2023/0281633 | A1 | 9/2023 | Asefi et al. | |
| 2024/0054471 | A1* | 2/2024 | Loh | G06Q 20/4012 |

* cited by examiner

Figure 3
300
Fixed Part
302
Configuration Part
304
Dynamic Part
306

DYNAMIC FINANCIAL PROTOCOL

BACKGROUND

Lack of interoperability between different financial systems can hinder seamless transaction processing and connectivity. Traditional mechanisms may create barriers to transactions and international trade. Without interoperable platforms and standardized protocols, businesses and individuals face challenges conducting transactions, resulting in increased costs, delays, and compliance burdens. Further, without standardized authentication mechanisms, fraudsters can exploit loopholes in transaction protocols to gain unauthorized access to users' devices and accounts. This can lead to unauthorized transactions, account takeovers, and financial losses.

SUMMARY

Examples provided herein are directed to a dynamical financial protocol.

According to one aspect, an example computer system for generating a dynamic financial protocol can include: one or more processors; and non-transitory computer-readable storage media encoding instructions which, when executed by the one or more processors, causes the computer system to: receive a request for a financial transaction from a user; validate information associated with the user, including Know Your Customer (KYC) details about the user; generate a financial identifier for the financial transaction, wherein the financial identifier is a global unique identifier for the financial transaction; generate a message in accordance with the dynamic financial protocol, wherein the message includes a fixed part, a configuration part, and a dynamic part, wherein: the fixed part includes the user's KYC details, an account of the user, and the financial identifier; the configuration part includes account details of a recipient; and the dynamic part is a multidimensional array that includes additional transaction details; and process the financial transaction initiated by the user based on validation of the recipient using the financial identifier.

According to another aspect, an example method for generating a dynamic financial protocol can include: receiving a request for a financial transaction from a user; validating information associated with the user, including Know Your Customer (KYC) details about the user; generating a financial identifier for the financial transaction, wherein the financial identifier is a global unique identifier for the financial transaction; generating a message in accordance with the dynamic financial protocol, wherein the message includes a fixed part, a configuration part, and a dynamic part, wherein: the fixed part includes the user's KYC details, an account of the user, and the financial identifier; the configuration part includes account details of a recipient; and the dynamic part is a multidimensional array that includes additional transaction details; and processing the financial transaction initiated by the user based on validation of the recipient using the financial identifier.

The details of one or more techniques are set forth in the accompanying drawings and the description below. Other features, objects, and advantages of these techniques will be apparent from the description, drawings, and claims.

DETAILED DESCRIPTION

This disclosure relates to a dynamic financial protocol.

Generally, the example dynamic financial protocol can be used to create a universally-accepted financial identifier for transactions initiated by an individual or an entity across various payment networks. The dynamic financial identifier can include, without limitation, a fixed part and a dynamic part, including such information as Know Your Client (KYC) details, machine/device details, bank account information, recipient details, and dynamically evolving factors such as devices, services, and subscriptions associated with the user.

There can be various advantages associated with the technologies described herein. For instance, the examples can enhance interoperability between systems, thereby exhibiting the practical application of a more efficient financial transaction process. Further, such financial transactions can be conducted without requiring traditional transaction rails (e.g., ACH, credit card, etc.), thereby further increasing flexibility. Further, other types of accounts can be added, such as computing device accounts, along with other configurable aspects like location, permissions, rules, blacklists (e.g., different individuals and/or entities), and/or policies. The enhanced information that is exchanged (e.g., user details and recipient location) allows for greater mitigation against fraud, thereby increasing the security of the system and enhancing the integrity and security of the financial transactions. Many other advantages are possible.

Figure 1:
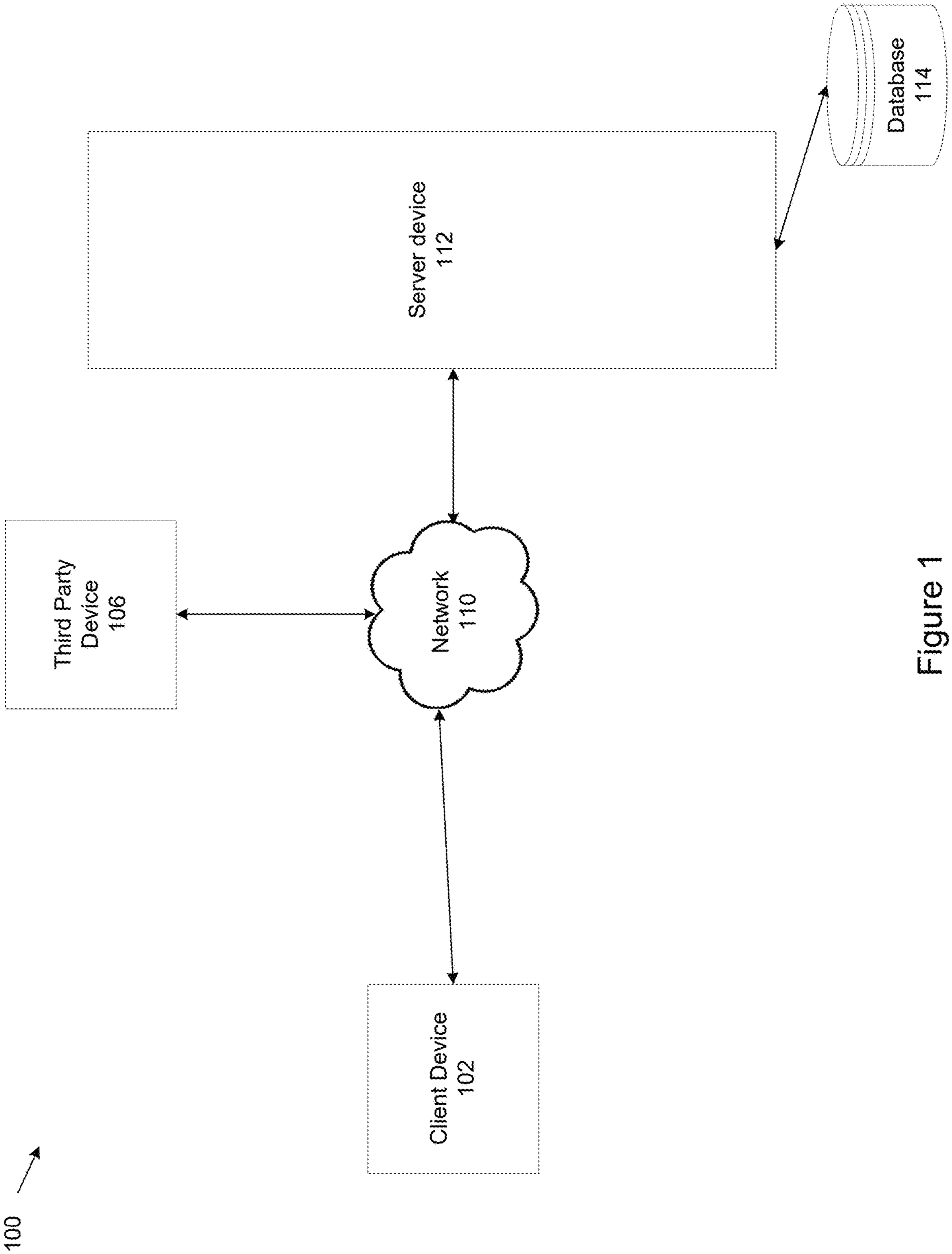
FIG. 1 shows an example system for providing a dynamic financial protocol.

FIG. 1 schematically shows aspects of one example system 100 programmed to generate a dynamic financial protocol. In this example, the system 100 can be a computing environment that includes a plurality of client and server devices. In this instance, the system 100 includes a client device 102, a third party device 106, a server device 112, and a database 114. The client device 102 and the third party device 106 can communicate with the server device 112 through a network 110 to accomplish the functionality described herein.

Each of the devices may be implemented as one or more computing devices with at least one processor and memory. Example computing devices include a mobile computer, a desktop computer, a server computer, or other computing device or devices such as a server farm or cloud computing used to generate or receive data.

In some non-limiting examples, the server device 112 is owned by a financial institution, such as a bank. The third party device 106 can be similarly configured. The client device 102 and the third party device 106 can be programmed to communicate with the server device 112 to facilitate financial transactions. Many other configurations are possible.

The example client device 102 is programmed to communicate with the server device 112 to conduct financial transactions. For instance, in one embodiment, the client device 102 is a smart phone, and the user of the smart phone initiates a financial transaction with a third party.

In this example, the financial transaction can be a payment from the user of the client device 102 to a third party. To initiate the payment, a wallet application on the client device 102 communicates with the server device 112.

The example third party device 106 is programmed to complete financial transactions. In one example, the third party device 106 can be a computing device owned by a third party financial institution. The server device 112 can communicate with the third party device 106 to conduct financial transactions. For instance, in the example above, the server device 112 can communicate with the third party device 106 to complete the payment from the user of the client device 102 to the third party.

The example server device 112 is programmed to facilitate financial transactions. In this example, this can include the payment from the client device 102 to the third party device 106. In the examples detailed below, the server device 112 is programmed to facilitate these financial transactions using the dynamic financial protocol described herein. Additional details on the server device 112 and the dynamic financial protocol are provided in FIGS. 2-4.

The example database 114 of the system 100 is programmed to store details associated with the financial transactions facilitated by the server device 112. In some examples, the database 114 is a relational database, an objected-oriented database, a hierarchical database, and/or a cloud database that stores various components of the dynamic financial protocol that facilitates the financial transactions described herein. Many other configurations are possible.

The network 110 provides a wired and/or wireless connection between the client devices 102, 106 and the server device 112. In some examples, the network 110 can be a local area network, a wide area network, the Internet, or a mixture thereof. Many different communication protocols can be used. Although only three devices are shown, the system 100 can accommodate hundreds, thousands, or more of computing devices.

Figure 2:
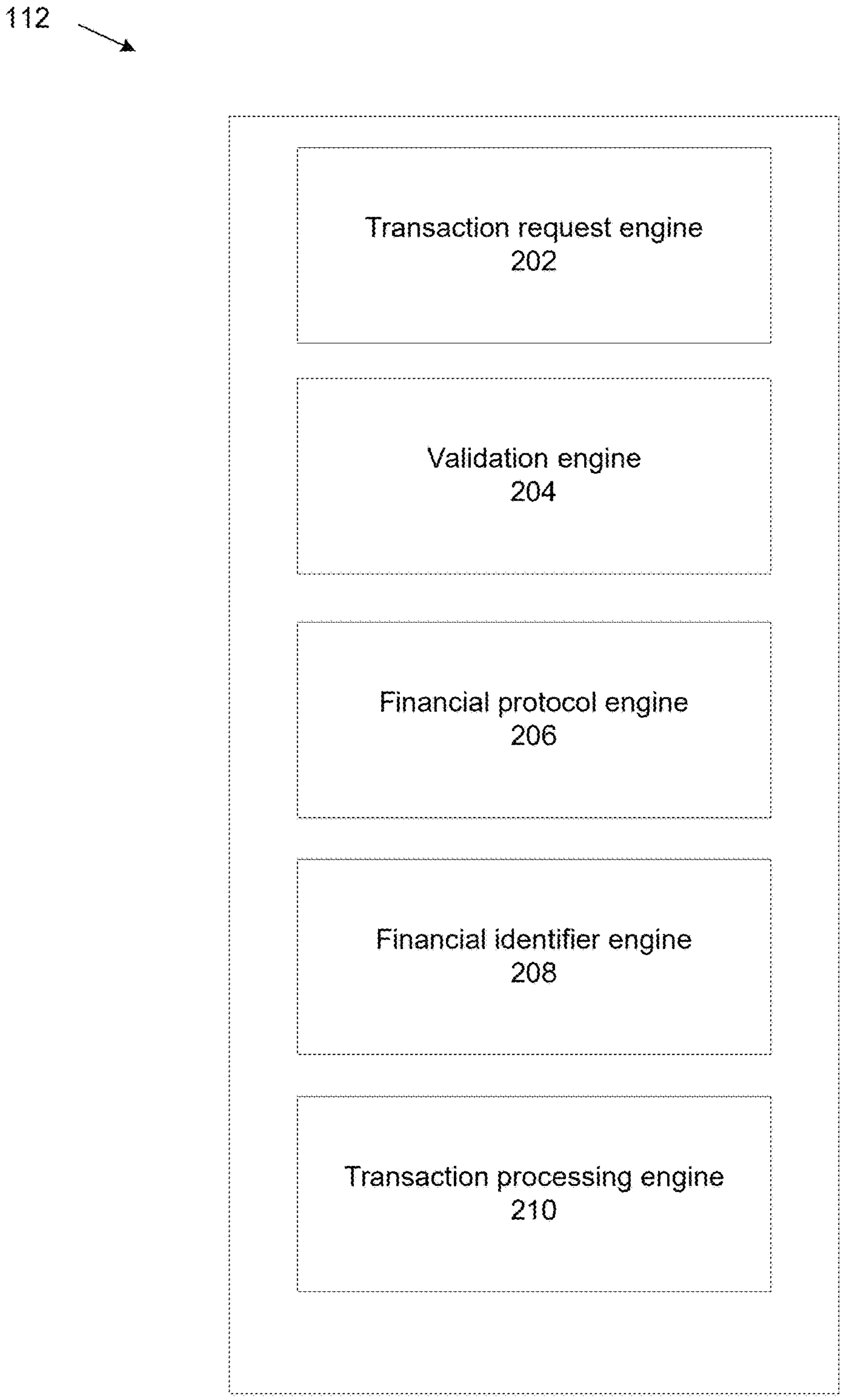
FIG. 2 shows example logical components of a server device of the system of FIG. 1.

Referring now to FIG. 2, additional details of the server device 112 are shown. In this example, the server device 112 has various logical engines that assist in generating the dynamic financial protocol. The server device 112 can, in this instance, include a transaction request engine 202, a validation engine 204, a financial protocol engine 206, a financial identifier engine 208, and a transaction processing engine 210. In other examples, more or fewer engines providing different functionality can be used.

The transaction request engine 202 is programmed to receive financial transaction requests. These financial transaction requests can be generated by an individual or an entity and may originate from any legitimate banking network or payment channel/gateway. For instance, in this example, the transaction request engine 202 receives the payment request from the user of the client device 102. This can include transactions for a variety of products, such as deposits, insurance, capital market, capital finance, etc.

Location parameters can be driven by the financial protocol. Such transaction requests will resolve to the country of origin, and transaction request engine 202 can immediately block any transactions originating using from specific OFAC countries.

Non-limiting examples of such financial requests follow.

```
transactionRequest1 = {
  "senderID": "user123",
  "recipientID": "merchant456",
  "amount": 100.00,
  "currency": "USD",
```

-continued

```
  "timestamp": "2024-08-07T14:23:00Z",
  "paymentChannel": "creditCard",
  "senderLocation": "37.7749,-122.4194", // San Francisco coordinates
  "deviceID": "device789"
}
transactionRequest2 = {
  "senderID": "user456",
  "recipientID": "user789",
  "amount": 250.00,
  "currency": "EUR",
  "timestamp": "2024-08-07T15:00:00Z",
  "paymentChannel": "bankTransfer",
  "senderLocation": "48.8566,2.3522", // Paris coordinates
  "deviceID": "device012"
}
transactionRequest3 = {
  "senderID": "user789",
  "recipientID": "service123",
  "amount": 15.99,
  "currency": "GBP",
  "timestamp": "2024-08-07T16:30:00Z",
  "paymentChannel": "digitalWallet",
  "senderLocation": "51.5074,-0.1278", // London coordinates
  "deviceID": "device345"
}
```

As noted above, the transaction request engine 202 can be generated by a wallet or other banking application on the client device 102. In this example, the transaction request engine 202 can be agnostic with respect to the source of the transaction request, as long as certain information is provided as detailed below. Further, as noted, the transaction request engine 202 is agnostic with respect to the "payment rails" used to generate the transaction request. For instance, the transaction request can come from various other sources, such as payment applications like Zelle, credit card, etc.

The validation engine 204 is programmed to validate the financial transaction request received by the transaction request engine 202. In this example, the validation engine 204 validates various aspects of the financial transaction request (e.g., user's location, KYC details (e.g., details like identification card verification, face verification, biometric verification, and/or document verification), device data associated with a device from which the transaction is initiated, etc.) to facilitate initiation of the transaction.

More specifically, the validation engine 204 initiates a comprehensive validation of the user's details using the dynamic financial protocol associated with the user. This can include, without limitation:

- verifying the user/sender's location ensures the transaction is initiated from an authorized region;
- validating the user's KYC details to confirm identity and compliance with regulatory requirements; and/or
- authenticating device data associated with the client device 102 used to initiate the transaction, ensuring security and preventing unauthorized access.

The validation engine 204 uses these details to verify the user and transaction details. For instance, the validation engine 204 can be programmed to verify the geolocation of the client device 102 as part of the financial transaction. The validation engine 204 can allow the financial transaction when the GPS location of the client device 102 is within a specific geography, such as a certain distance around the user's home or place of work. When the request for the financial transaction is generated with a GPS location within the "geofence", the validation engine 204 allows the financial transaction to proceed. Otherwise, the transaction request can be denied by the validation engine 204.

Such configuration information can be profile-based, in that each user can maintain a profile with information associated with the user. This information can include account details, KYC details, as well as configuration information like the GPS-based restriction noted above. Many other configurations are possible.

The server device 112 of the financial institution is programmed to use the dynamic financial protocol to initiate the financial transaction. Thus, the noted details (e.g., sender's location, KYC details, and device data) can be incorporated into the dynamic financial protocol associated with the financial transaction, as provided below.

Figure 3:
FIG. 3 shows an example message generated according to the dynamic financial protocol by the server device of FIG. 2.

The financial protocol engine 206 is programmed to generate the financial transaction according to the dynamic financial protocol. In this example, the dynamic financial protocol is a universally-recognized protocol for processing financial transactions in diverse environments. This dynamic financial protocol can, without limitation, comprise three components that are generated in a message 300, as depicted in FIG. 3:

- a fixed part 302, which can include the user's KYC details (e.g., SSN or entity ID), one or more associated bank account numbers, and a financial identifier that uniquely identifies each transaction (see the financial identifier engine 208 below);
- a configuration part 304, which can encompass recipient account details, GPS location, payment channel/gateway information, and other transaction-specific configurations for the current financial transaction; and/or
- a dynamic part 306, which can be a multidimensional array containing devices/machines, services, and subscriptions associated with the user, and can be dynamically evolving based on the nature of the initiated transaction (peer-to-peer, business-to-consumer, application-based, bank-to-bank, within-us transactions, etc.) initiated by the user.

In some examples, the fixed part 302 and the configuration part 304 of the message 300 are fixed in length. Conversely, the dynamic part 306 can be variable in length. For instance, the dynamic part 306 can vary in length based upon the type of financial transaction and/or information captured by the client device 102 and/or the server device 112 for inclusion in the dynamic financial protocol, as provided further below.

One non-limiting example of a financial transaction that is generated according to the dynamic financial protocol follows.

```
message = {
  "fixedPart": {
    "KYCDetails": {
      "SSN": "123-45-6789",
      "bankAccountNumbers": ["1234567890", "0987654321"],
      "financialIdentifier": "FIN12345"
    }
  },
  "configurationPart": {
    "recipientAccountDetails": "account56789",
    "GPSLocation": "37.7749,-122.4194", // San Francisco coordinates
    "paymentChannel": "creditCard"
  },
  "dynamicPart": [
    {
      "deviceID": "device789",
      "services": ["streamingService", "cloudStorage"],
      "subscriptions": ["monthlySubscription", "annualSubscription"]
    },
    {
      "deviceID": "device012",
```

-continued

```
      "services": ["onlineGaming"],
      "subscriptions": ["monthlySubscription"]
    }
  ]
}
```

The financial identifier engine 208 of FIG. 2 is programmed to generate a Financial Identifier (FIN) for each financial transaction in real time. This involves automatically creating the FIN number and dynamic part as per the specifications defined in the dynamic financial protocol.

For instance, in one example, the financial identifier engine 208 generates a FIN for each financial transaction. The FIN can be generated based upon a combination of KYC information and the user's bank account from which the transaction amount is to be debited. In some examples, the FIN is a Globally Unique Identifier (GUID) that uniquely identifies each financial transaction within the system 100. In one example, the FIN is a 128-bit text string, although many other configurations are possible.

Example additional details on the FIN makeup include:

KYC information: includes data such as social security number or entity ID, and relevant identification details.

Bank Account Details: one or more bank account numbers associated with the user.

GUID generation: uses algorithms to generate a unique 128-bit string that identifies the financial transaction.

In the future, the FIN could be modified. For instance, the FIN could take a quantum resistant key length and/or be generated using other mechanisms.

The transaction processing engine 210 is programmed to execute the financial transaction once the FIN has been created by the financial identifier engine 208. Generally, this can include communicating with the third party device 106 using the dynamic financial protocol to accomplish the financial transaction.

Validation of the recipient of the financial transaction can be conducted by the transaction processing engine 210 as follows:

- verifying the recipient's GPS location to ensure alignment with transaction parameters;
- sending a PING message from the server device 112 to the third party device 106, prompting acknowledgment; and
- validating the acknowledgment of the PING message using the third party device 106 details, ensuring secure communication and recipient verification.

The dynamic financial protocol thus ensures the creation of a universally accepted dynamic financial identifier for transactions initiated by users or entities, facilitating secure, transparent, and compliant financial transactions across diverse networks and platforms.

A more specific example follows. Consider a scenario where a first individual (payor) wants to transfer funds to a second individual (payee) using the first individual's mobile device.

The transaction is initiated through the client device 102 on the system 100, providing the recipient details (e.g., the second individual's phone number, email address, account number, etc.) and the desired amount. The transaction can be initiated via any payment gateway (internet banking, cross-border, etc.). The server device 112 receives the transaction request, and validates the first individual's identity, location, and device details in real-time using the dynamic financial protocol.

As the dynamic financial protocol associated with the first individual includes bank accounts, geographic location, and devices (mobile devices, IoT devices) associated with the first individual, the server device 112 validates first individual's identity before processing the transaction request. Once validated, the system 100 generates a FIN for the transaction, incorporating first individual's KYC details, bank account details, and recipient information. Additionally, the system 100 dynamically adjusts the FIN based upon factors such as the client device 102, service subscriptions, payment channel, and the nature of the transaction.

For instance, several examples of dynamic FIN adjustment follow.

Example 1: user initiates a peer-to-peer payment using a mobile banking application.

Dynamic Adjustment: includes mobile device details like IMEI number.

Service Subscriptions: if the user has a subscription to a premium payment service, this is included.

```
Geolocation: confirms the user's location is within an authorized area.
Pseudo Code:
  transactionFIN1 = generateFIN(userKYC, bankAccount, deviceID,
subscriptionService, geoLocation)
```

Example 2: user makes an online purchase from a merchant using a digital wallet.

Dynamic Adjustment: captures the type of device used (e.g., smartphone, tablet).

Service Subscriptions: includes any loyalty programs or discounts applied.

Payment Channel: specifies the digital wallet being used.

```
Pseudo Code:
  transactionFIN2 = generateFIN(userKYC, bankAccount, deviceID,
loyaltyProgram, digitalWallet)
```

As part of the transaction processing, the dynamic financial protocol verifies the second individual's location using GPS coordinates and sends a PING message from the first individual's device to the third party device 106 associated with the second individual (e.g., this could be the second individual's personal device or a server associated with the second individual's financial institution). Upon receiving the PING message, the third party device 106 acknowledges the transaction, and the system 100 validates the recipient details to ensure the transaction's authenticity. With the FIN securely established and recipient validation confirmed, the system 100 proceeds to process the financial transaction, facilitating the seamless transfer of funds from the first individual to the second individual in a secure and efficient manner.

Through this use case, the system demonstrates its ability to enable universally accepted and dynamically validated financial transactions while ensuring the integrity and security of the process. While described in the context of a first individual and a second individual, in various other examples the transaction may instead be between an individual and another entity (e.g., merchant, organization, business, etc.) or two entities.

Referring at least to FIG. 3, the dynamic part 306 of the message 300 of the dynamic financial protocol can capture various information depending on the type of financial transaction. For instance, the dynamic part 306 can capture various information associated with the financial transaction.

In one example, the dynamic part 306 can capture information associated with the payment of a subscription fee. For instance, in one example a user (e.g., a payor),ay subscribe to an Internet video streaming service. Many merchants or providers, such as Internet video streaming service providers, require subscribers to enroll and/or create an account to receive access to the product and/or service (e.g., the Internet video streaming service). Such accounts may have account numbers that are unique to the subscriber and the product and/or service.

The merchant or providers may store (e.g., on their respective systems) the account numbers and associate them with each respective customer. Continuing the example, the dynamic part 306 of the message 300 can capture information associated with the user's subscription, such as the account number associated with the user. In this example, the dynamic part 306 of the message 300 could include the account number associated with the user's Internet video streaming service account.

When making a payment, the dynamic part 306 of the dynamic financial protocol can capture the account number (i.e., the Internet video streaming service account number) so that when payment is sent by the user to the Internet video streaming service provider, the payment is properly applied to the user's account.

While described in the context of a streaming service, the dynamic financial protocol can be used to make similar payments to other providers and/or merchants, like those for utilities and other subscriptions, by including the specific account numbers associated with those services and/or products in the dynamic part 306. That is, the dynamic part 306 may be dynamically changed based on the particular nature of the payment, and in particular, may be dynamically changed to include the specific account number that the payee has stored and associated with the payor.

The dynamic financial protocol can also facilitate different types of payments. For instance, when traveling, the user can use the dynamic financial protocol to make payments to allow for the user to use the Internet video streaming service at a discounted rate at another location. The dynamic part 306 captures information like the account number and location to allow for settlement of the cost of the subscription with Internet video streaming service provider to do so.

For instance, the following is an example of a subscription payment for a movie streaming service.

User Configuration:

User subscribes to the movie streaming service and their subscription details (account number, subscription plan) are stored.

User's mobile device is registered with the system, including geolocation and device ID.

At Neighbor's House:

User attempts to access the movie streaming service using their account on the neighbor's device.

The system detects the different device and location.

Information Exchange:

Device Details: neighbor's device details are captured and authenticated.

Subscription Verification: user's subscription is verified against the new device and location.

Dynamic Adjustment: dynamic part of the FIN is adjusted to include the neighbor's device details and location.

A non-limiting instance of this example follows.

```
dynamicPartHome = {
  "deviceID": "userDevice123",
  "location": "userHomeCoordinates",
  "subscription": "SteamUHD"
}
## Neighbor's Device
dynamicPartNeighbor = {
  "deviceID": "neighborDevice456",
  "location": "neighborCoordinates",
  "subscription": "StreamBasic"
}
transactionFIN = generateFIN(userKYC, bankAccount, dynamicPartNeighbor,
subscriptionRate, adjustedSubscriptionRate)
```

Figure 4:
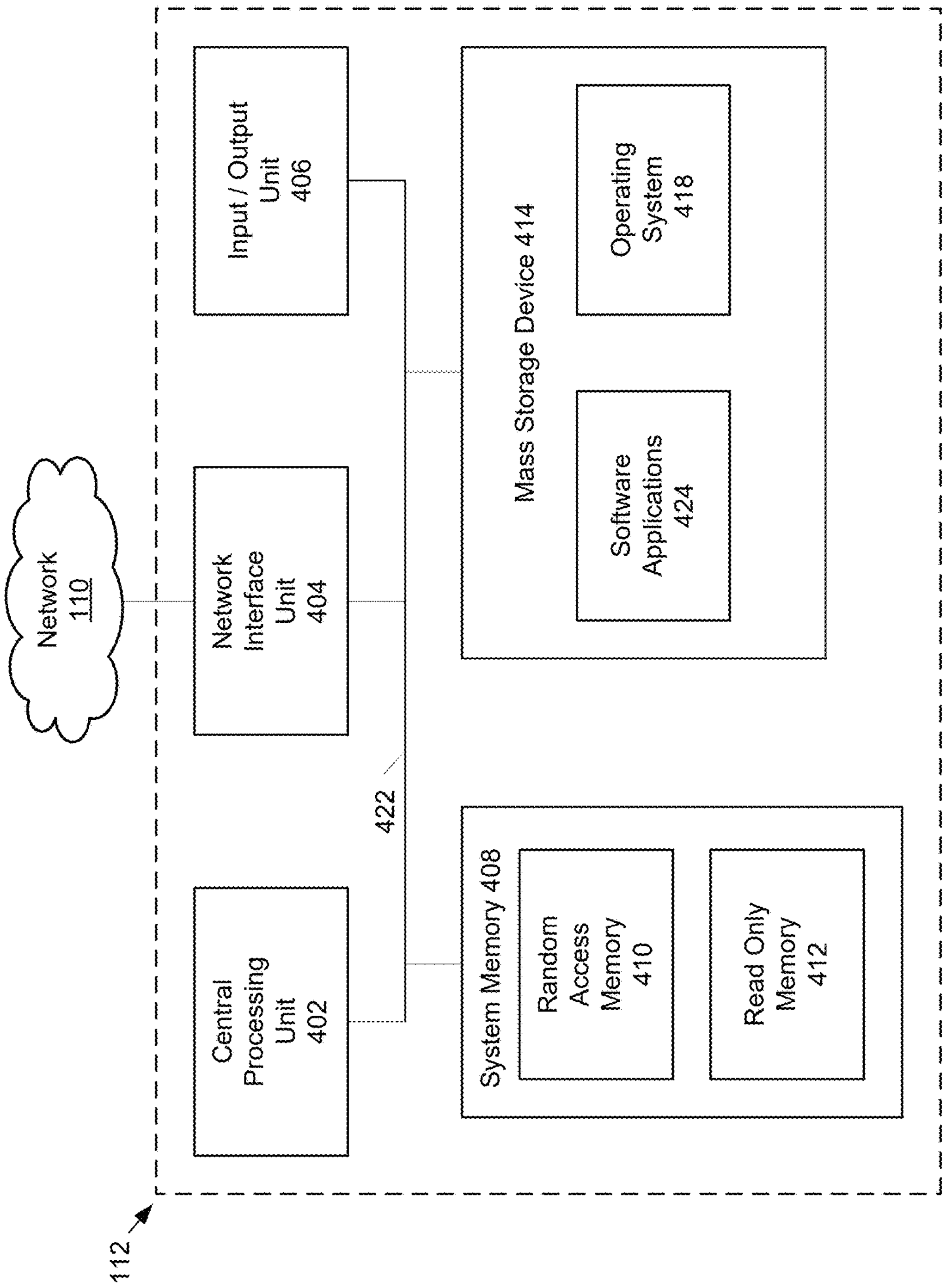
FIG. 4 shows example physical components of the server device of FIG. 2.

As illustrated in the embodiment of FIG. 4, the example server device 112, which provides the functionality described herein, can include at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system containing the basic routines that help transfer information between elements within the server device 112, such as during startup, is stored in the ROM 412. The server device 112 further includes a mass storage device 414. The mass storage device 414 can store software instructions and data. A central processing unit, system memory, and mass storage device similar to that shown can also be included in the other computing devices disclosed herein.

The mass storage device 414 is connected to the CPU 402 through a mass storage controller (not shown) connected to the system bus 422. The mass storage device 414 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 404 connected to the system bus 422. It should be appreciated that the network interface unit 404 may also be utilized to connect to other types of networks and remote computing systems. The server device 112 also includes an input/output controller 406 for receiving and processing input from a number of other devices, including a touch user interface display screen or another type of input device. Similarly, the input/output controller 406 may provide output to a touch user interface display screen or other output devices.

As mentioned briefly above, the mass storage device 414 and the RAM 410 of the server device 112 can store software instructions and data. The software instructions include an operating system 418 suitable for controlling the operation of the server device 112. The mass storage device 414 and/or the RAM 410 also store software instructions and applications 424, that when executed by the CPU 402, cause the server device 112 to provide the functionality of the server device 112 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for generating a dynamic financial protocol, comprising:

one or more processors; and non-transitory computer-readable storage media encoding instructions which, when executed by the one or more processors, cause the computer system to:

receive a request for a financial transaction from a user;

validate information associated with the user, including Know Your Customer (KYC) details about the user;

generate a financial identifier for the financial transaction, wherein the financial identifier is a global unique identifier for the financial transaction;

generate a message in accordance with the dynamic financial protocol, wherein the message includes a fixed part, a configuration part, and a dynamic part, wherein:

the fixed part includes the user's KYC details, an account of the user, and the financial identifier, the configuration part includes account details of a recipient; and the dynamic part is a multidimensional array that includes additional transaction details including device identification information, service subscriptions, and location coordinates for the user, wherein the multidimensional array comprises nested arrays being variable in length and content based upon a type of the financial transaction, and wherein the dynamic part is dynamically adjusted based on factors including the device identification information, the service subscriptions, and the location coordinates; and process the financial transaction initiated by the user based on validation of the recipient using the financial identifier.

2. The computer system of claim 1, wherein the configuration part of the message further includes: a location of a client device of the user, and device data associated with the client device.

3. The computer system of claim 2, comprising further instructions which, when executed by the one or more processors, cause the computer system to restrict the financial transaction based upon the location of the client device.

4. The computer system of claim 1, wherein the configuration part of the message further includes a payment channel for the financial transaction.

5. The computer system of claim 1, wherein the additional transaction details of the dynamic part include subscription information associated with the user.

6. The computer system of claim 1, comprising further instructions which, when executed by the one or more processors, cause the computer system to:

send the message from a client device of the user to a device of the recipient; and receive an acknowledgement of the message from the device of the recipient.

7. The computer system of claim 6, comprising further instructions which, when executed by the one or more processors, cause the computer system to validate the financial transaction using device details from the recipient.

8. The computer system of claim 7, wherein the device details include a location of the recipient.

9. The computer system of claim 1, wherein the financial identifier is generated based on a combination of the KYC details and the account of the user.

10. A method for generating a dynamic financial protocol, comprising:

receiving a request for a financial transaction from a user;

validating information associated with the user, including Know Your Customer (KYC) details about the user;

generating a financial identifier for the financial transaction, wherein the financial identifier is a global unique identifier for the financial transaction;

generating a message in accordance with the dynamic financial protocol, wherein the message includes a fixed part, a configuration part, and a dynamic part, wherein:

the fixed part includes the user's KYC details, an account of the user, and the financial identifier;

the configuration part includes account details of a recipient; and the dynamic part is a multidimensional array that includes additional transaction details including device identification information, service subscriptions, and location coordinates for the user, wherein the multidimensional array comprises nested arrays being variable in length and content based upon a type of the financial transaction, and wherein the dynamic part is dynamically adjusted based on factors including the device identification information, the service subscriptions, and the location coordinates; and processing the financial transaction initiated by the user based on validation of the recipient using the financial identifier.

11. The method of claim 10, wherein the configuration part of the message further includes: a location of a client device of the user, and device data associated with the client device.

12. The method of claim 11, further comprising restricting the financial transaction based upon the location of the client device.

13. The method of claim 10, wherein the configuration part of the message further includes a payment channel for the financial transaction.

14. The method of claim 10, wherein the additional transaction details of the dynamic part include subscription information associated with the user.

15. The method of claim 10, further comprising:

sending the message from a client device of the user to a device of the recipient; and receiving an acknowledgement of the message from the device of the recipient.

16. The method of claim 15, further comprising validating the financial transaction using device details from the recipient.

17. The method of claim 16, wherein the device details include a location of the recipient.

18. The method of claim 10, wherein the financial identifier is generated based on a combination of the KYC details and the account of the user.

* * * * *